US011338573B2

(12) United States Patent
Shimomura et al.

(10) Patent No.: US 11,338,573 B2
(45) Date of Patent: May 24, 2022

(54) INKJET IMAGE FORMING APPARATUS AND TRANSFER CONTROL METHOD

(71) Applicant: Konica Minolta, Inc., Tokyo (JP)

(72) Inventors: Midori Shimomura, Tokyo (JP); Yukimasa Azuma, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 78 days.

(21) Appl. No.: 16/859,114

(22) Filed: Apr. 27, 2020

(65) Prior Publication Data
US 2020/0338882 A1 Oct. 29, 2020

(30) Foreign Application Priority Data

Apr. 26, 2019 (JP) .............................. JP2019-085870

(51) Int. Cl.
B41J 2/01 (2006.01)
B41J 2/005 (2006.01)
B41J 2/14 (2006.01)
B41J 2/045 (2006.01)
B41J 11/00 (2006.01)

(52) U.S. Cl.
CPC ............. B41J 2/01 (2013.01); B41J 2/0057 (2013.01); B41J 2/0451 (2013.01); B41J 2/14104 (2013.01); B41J 11/00212 (2021.01); B41J 11/00214 (2021.01); B41J 2002/012 (2013.01)

(58) Field of Classification Search
CPC .... B41J 2/0057; B41J 2/14104; B41J 2/0451; B41J 2002/012; B41J 11/00214; B41J 11/00212; B41J 11/0095; B41J 2/01; H04N 1/32667; H04N 1/32635; H04N 1/00015; H04N 1/00045; H04N 1/0005; H04N 1/00055
USPC ........................................................ 347/102
See application file for complete search history.

(56) References Cited

U.S. PATENT DOCUMENTS

2005/0212852 A1* 9/2005 Konno ....................... B41J 2/01
347/40

FOREIGN PATENT DOCUMENTS

JP 2000127359 A 5/2000
JP 2007230226 A 9/2007

* cited by examiner

Primary Examiner — Kristal Feggins
Assistant Examiner — Alexander D Shenderov
(74) Attorney, Agent, or Firm — Cantor Colburn LLP

(57) ABSTRACT

An inkjet image forming apparatus includes a transferer and a hardware processor. The transferer transfers, onto a recording medium, ink that is ejected from an inkjet head and is borne on a transfer member. The hardware processor performs control for reducing transferability of the ink in a case where the ink borne on the transfer member is not-to-be-transferred ink, compared with a case where the ink is to-be-transferred ink.

17 Claims, 9 Drawing Sheets under 35 U.S.C. § 119 Japanese Patent Application No. 2019-085870
INKJET IMAGE FORMING APPARATUS AND TRANSFER CONTROL METHOD

CROSS REFERENCE TO RELATED APPLICATIONS

The present invention claims priority under 35 U.S.C. § 119 Japanese Patent Application No. 2019-085870 filed on Apr. 26, 2019, the entire content of which is incorporated herein by reference.

BACKGROUND

Technological Field

The present invention relates to an inkjet image forming apparatus and a transfer control method.

Description of Related Art

Recently, inkjet-type image forming apparatuses (hereinafter, referred to as inkjet image forming apparatuses) have come into widespread use as apparatuses that record high-definition images on various recording media such as paper and fabric.

To decrease the cost, inkjet image forming apparatuses have been recently desired to suppress an amount of ink ejected from an inkjet head, by extension, an amount of ink attached to a recording medium to a minimum. However, such a reduction in the amount of attached ink involves a problem that a hiding ratio decreases in printing of a solid image and unevenness occurs in the solid image.

Against this problem, if a spherical droplet ejected from the inkjet head can be flattened (expanded) on a recording medium, the reduction in the hiding ratio can be coped with. Adoption of such a method, on the other hand, may cause ink bleeding on the recording medium depending on the viscosity of ink (particularly in the case where the viscosity of ink is low).

To cope with the aforementioned problems, transfer-type (also referred to as intermediate-transfer-type) inkjet image forming apparatuses have been proposed which allow a transfer member such as a transfer belt or a transfer drum to temporarily bear an image formed by ink ejected from an inkjet head and which then transfer such an image onto a recording medium. Such inkjet image forming apparatuses are described, for example, in Japanese Patent Application Laid-Open No. 2007-230226 (hereinafter, referred to as PTL 1) and Japanese Patent Application Laid-Open No. 2000-127359 (hereinafter, referred to as PTL 2). Such transfer-type inkjet image forming apparatuses are capable of expanding ink on the transfer member without causing bleeding. Thus, the transfer-type inkjet image forming apparatuses can print a solid image of evenly expanded ink on a recording medium while suppressing an amount of ink ejected from the inkjet head.

Meanwhile, it is important for inkjet image forming apparatuses to detect and address an image defect such as a lack or distortion of ejected ink from the viewpoint of reducing waste paper and waste ink. Accordingly, many inkjet image forming apparatuses have a function of regularly printing a test pattern for image adjustment to monitor whether there is an image defect while the apparatuses are in operation.

In addition, in inkjet image forming apparatuses, a situation may occur where unintended ink is attached to a transfer member when the apparatuses stop in response to the occurrence of an abnormal event such as jamming, because of dripping of ink that has been attached to a portion around nozzles of an inkjet head, or the like. The ink attached to the transfer member need not be transferred onto a recording medium.

Image forming apparatuses of the related art, however, process this useless ink attached to the transfer member by transferring the ink onto recording media to remove the ink. The resulting waste paper problematically increases the cost.

As described in PTL 1 and PTL 2, performing control for separating a transfer nip is considered to be the simplest measure as a solution to this problem. However, if recent inkjet image forming apparatuses having increased printing speed and increased size attempt to perform an operation for separating the transfer nip in a short time, a large-scale mechanism is required and an image defect such as shock noise may occur.

SUMMARY

It is an object of the present invention to provide an inkjet image forming apparatus and a transfer control method that are capable of suppressing both the occurrence of waste recording media and a reduction in productivity of the apparatus.

To achieve at least one of the abovementioned objects, according to an aspect of the present invention, an inkjet image forming apparatus, reflecting one aspect of the present invention comprises:

a transferer that transfers, onto a recording medium, ink that is ejected from an inkjet head and is borne on a transfer member; and a hardware processor that performs control for reducing transferability of the ink in a case where the ink borne on the transfer member is not-to-be-transferred ink, compared with a case where the ink is to-be-transferred ink.

To achieve at least one of the abovementioned objects, according to an aspect of the present invention, a transfer control method reflecting one aspect of the present invention is a method in an inkjet image forming apparatus that transfers, onto a recording medium, ink that is ejected from an inkjet head and is borne on a transfer member, the transfer control method comprising performing control for reducing transferability of the ink in a case where the ink borne on the transfer member is not-to-be-transferred ink, compared with a case where the ink is to-be-transferred ink.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
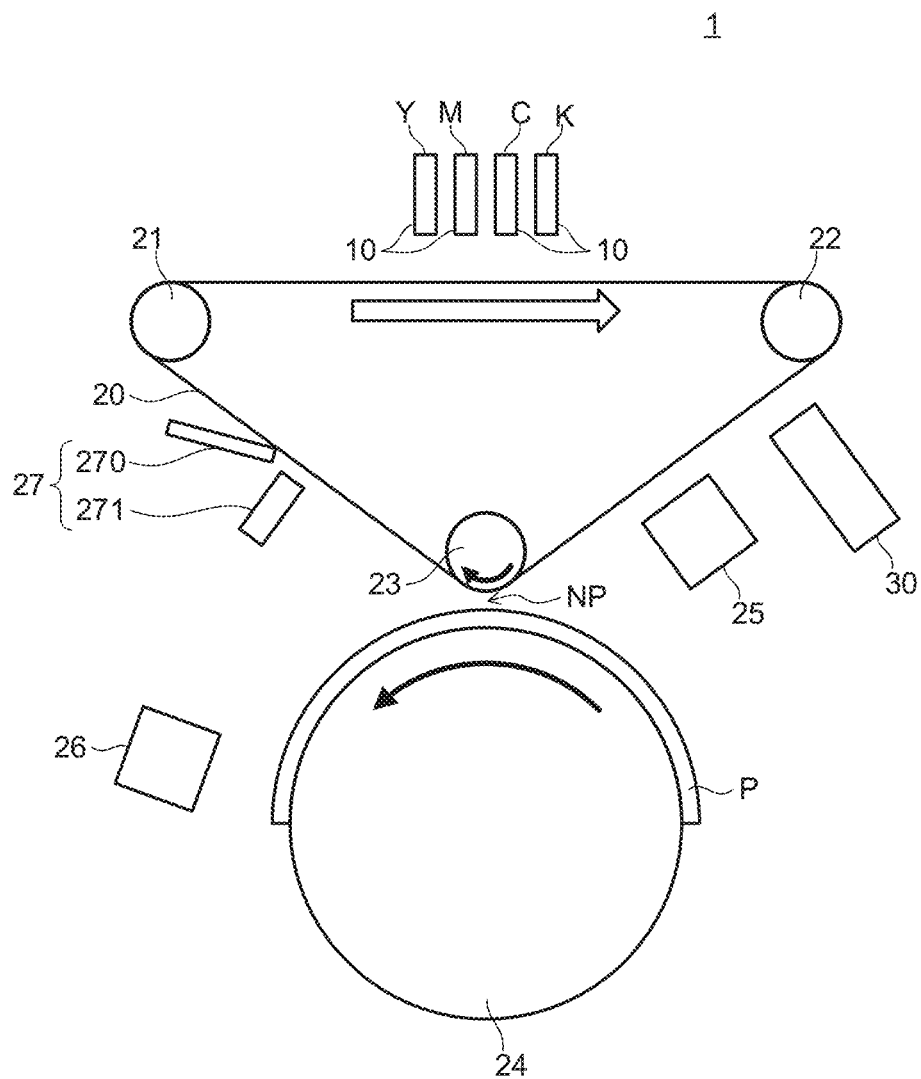
FIG. 1 is a schematic configuration diagram of an inkjet image forming apparatus according to a present embodiment.
Figure 2:
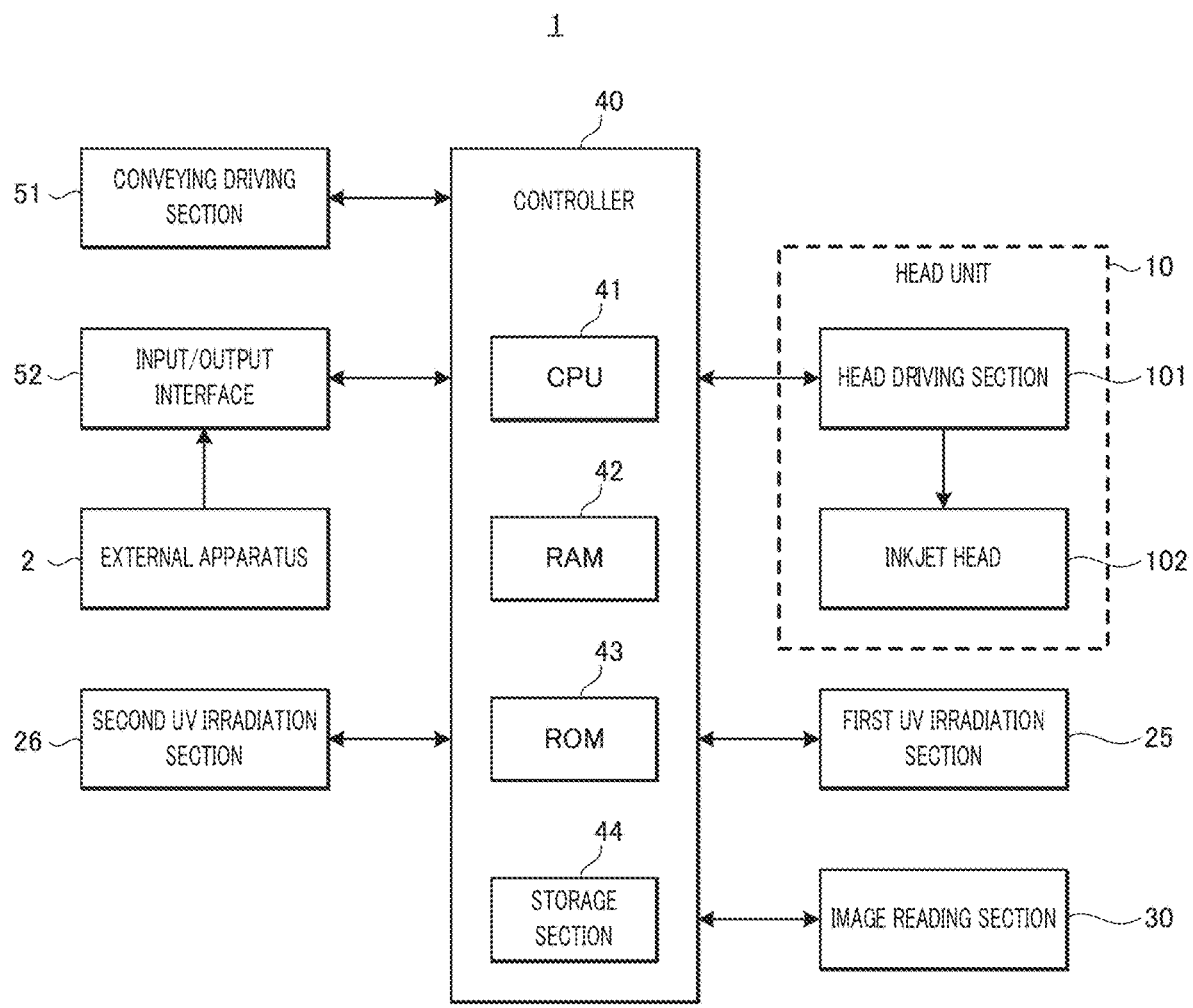
FIG. 2 is a block diagram illustrating a major functional configuration of the inkjet image forming apparatus illustrated in FIG. 1.

FIG. 1 is a diagram illustrating a schematic configuration of inkjet image forming apparatus 1 according to a present embodiment. In addition, FIG. 2 is a block diagram illustrating a major functional configuration of inkjet image forming apparatus 1.

Inkjet image forming apparatus 1 includes head units 10 each equipped with inkjet head 102 (see FIG. 2), transfer belt 20 serving as an image bearing member or an intermediate transfer member, driven rollers 21 and 22 on which transfer belt 20 is stretched in a rotatable manner, transfer roller 23 serving as a driving roller, conveying drum 24 that conveys recording medium P, and controller 40 (see FIG. 2) that controls entire inkjet image forming apparatus 1.

Inkjet image forming apparatus 1 also includes first ultraviolet (UV) irradiation section 25 that adjusts a viscosity of ink that has been ejected on transfer belt 20, second UV irradiation section 26 that cures the ink transferred on recording medium P, cleaning section 27 that cleans transfer belt 20, image reading section 30, and conveying driving section 51 (see FIG. 2) that drives individual components such as transfer roller 23 and conveying drum 24. Among the aforementioned components, first UV irradiation section 25 corresponds to a "viscosity adjuster" according to an aspect of the present invention and has a role of adjusting a viscosity of ink on transfer belt 20 in a non-contact manner.

Inkjet image forming apparatus 1 also includes a feeding section (not illustrated) that mounts recording medium P thereon to feed recording medium P to conveying drum 24, a discharge section (not illustrated) that discharges recording medium P on which an image has been transferred to a downstream side of conveying drum 24 in a conveying direction, a display section (not illustrated) that displays the state of the apparatus, and so on. Since these are known components, illustration and description thereof are omitted. In addition, not only paper such as normal paper and coated paper but also various media such as fabric and sheet-like resin on which ink landed on the surface thereof is fixable are usable as recording medium P.

Transfer belt 20 is stretched around driven rollers 21 and 22 disposed at upper positions and transfer roller 23 disposed at a lower position. A driving force of a transfer motor (not illustrated) of conveying driving section 51 is transmitted to transfer roller 23, which causes transfer belt 20 to rotate clockwise in FIG. 1. As a specific example of transfer belt 20, an endless belt is used in which an elastic layer of silicone rubber, a reflection layer on which aluminum (Al) is deposited, and a surface layer of polypropylene (PP) are stacked on a substrate of polyimide (PI). In addition, as a specific example of transfer roller 23, a rubber roller having a diameter of 100 mm and having a surface-layer rubber thickness of 10 mm is used.

In inkjet image forming apparatus 1, the aforementioned transfer motor is driven on the basis of a control signal supplied from controller 40, which causes transfer roller 23 to rotate clockwise in FIG. 1. This consequently causes transfer belt 20 to rotate clockwise (see each arrow in FIG. 1). In a specific example, the rotation speed of transfer roller 23 is controlled so that transfer belt 20 rotates at a speed (printing speed) of 600 mm/s under the control of controller 40.

Conveying drum 24 rotates with respect to a rotation axis that extends in a direction perpendicular to the drawing of FIG. 1 (hereinafter, referred to as a "perpendicular direction") in a state where recording medium P is held on an outer peripheral curved surface (conveying surface) having a cylindrical surface shape. In this manner, conveying drum 24 conveys recording medium P in a conveying direction along the conveying surface. Specifically, conveying drum 24 includes a conveying-drum motor (not illustrated). This motor is driven by control performed by controller 40 to cause conveying drum 24 to rotate counterclockwise in FIG. 1. In a specific example, a large metal drum (for example, a triple-sized cylinder for a printer) is used as conveying drum 24.

In a specific example, transfer belt 20 and conveying drum 24 that are described above have a width, that is, an axis-direction length of 800 mm.

Transfer roller 23 is disposed above conveying drum 24 to oppose conveying drum 24 and applies a pressure onto conveying drum 24 through transfer belt 20. In addition, conveying drum 24 comes into contact with transfer roller 23 by the pressure, with transfer belt 20 interposed therebetween. In this manner, transfer nip NP that transfers an ink image from transfer belt 20 onto recording medium P is formed. Such transfer nip NP corresponds to a "transferer" according to an aspect of the present invention.

In a specific example, the initial value of an applied weight or a pressing force (hereinafter, referred to as a "transfer pressure") at transfer nip NP is set to 80 N. In addition, the transfer pressure is changeable by transfer roller 23 moving in the vertical direction in FIG. 1 under the control of controller 40.

In this example, the axis of transfer roller 23 is linked to a solenoid or the like (not illustrated) of conveying driving section 51. The solenoid or the like is driven under the control of controller 40, and consequently the axis of transfer roller 23 slightly moves downward or upward in FIG. 1. In this manner, the transfer pressure is changeable to a value greater than or less than 80 N. In addition, in this example, an operation for greatly moving the axis of transfer roller 23 downward or upward in FIG. 1 to separate transfer nip NP and press (bring) transfer nip NP (into contact) can be performed under the control of controller 40.

Each head unit 10 ejects ink onto transfer belt 20 from nozzle openings provided on an ink ejection surface that opposes transfer belt 20 to cause transfer belt 20 to bear an image. Conveying drum 24 conveys recording medium P so that the image borne on transfer belt 20 is transferred to a predetermined position of recording medium P at transfer nip NP.

In inkjet image forming apparatus 1 according to the present embodiment, four head units 10 corresponding to inks of four colors of yellow (Y), magenta (M), cyan (C), and black (K) are arranged at a predetermined interval in an order of colors of Y, M, C, and K from the upstream side in the rotation direction of transfer belt 20.

Each head unit 10 includes inkjet head 102 (see FIG. 2). Inkjet head 102 is equipped with a plurality of recording elements each including a pressure chamber that stores ink, a piezoelectric element disposed on a wall surface of the pressure chamber, and a nozzle. In each of these recording elements, when a driving signal for causing the piezoelectric element to deform and operate is input, the pressure chamber deforms due to a deformation of the piezoelectric element. This changes the pressure in the pressure chamber, and consequently ink is ejected from the nozzle that communicates with the pressure chamber.

A range in which the nozzles included in each inkjet head 102 are arranged in the perpendicular direction covers a perpendicular-direction width of a region where an image is to be recorded in recording medium P conveyed by conveying drum 24. The positions of head units 10 are fixed relative to the rotation axis of conveying drum 24 for use when an image is recorded. That is, inkjet image forming apparatus 1 is a single-pass-type inkjet image forming apparatus.

In the present embodiment, as the ink that is ejected from each inkjet head 102 onto transfer belt 20, ink having a viscosity that changes depending on an amount of activation energy supplied to transfer belt 20 (an amount of ultraviolet (UV) output from first UV irradiation section 25 in this example) is used. Specifically, ink having a property that the viscosity increases as the amount of UV which the ink is irradiated with by first UV irradiation section 25 increases. That is, an image forming section of this inkjet image forming apparatus 1 adopts a UV-curing-type inkjet system.

First UV irradiation section 25 is disposed such that transfer belt 20 located on the upstream side of transfer nip NP is irradiated with UV (hereinafter, referred to as UV light). First UV irradiation section 25 has a role of increasing the viscosity of ink attached to transfer belt 20 or preliminary curing ink attached to transfer belt 20 under the control of controller 40. In a specific example, first UV irradiation section 25 includes a UV light source that outputs UV light having a wavelength of 395 nm. The default value of the irradiation intensity in a normal print job is set to 5 mW/cm$^2$.

Second UV irradiation section 26 is disposed such that recording medium P that is conveyed to the downstream side of transfer nip NP is irradiated with UV light. Second UV irradiation section 26 has a role of fully curing ink that has been preliminary cured by first UV irradiation section 25 and has been transferred by transfer nip NP, under the control of controller 40. In a specific example, second UV irradiation section 26 includes a UV light source that outputs UV light having a wavelength of 395 nm. The default value of the irradiation intensity in a normal print job is set to 10 W/cm$^2$.

Cleaning section 27 is disposed on the downstream side of transfer nip NP in the conveying direction of recording medium P. Cleaning section 27 includes cleaning blade 270 that cleans the surface of transfer belt 20, and cleaning liquid supply section 271 that applies (supplies) a cleaning liquid toward cleaning blade 270.

Cleaning blade 270 has a blade width that is substantially equal to the width of transfer belt 20, and abuts against the surface of transfer belt 20 between driven roller 21 and transfer roller 23. Cleaning blade 270 is disposed to be inclined in a counter-rotation direction so that a tip of cleaning blade 270 abuts against transfer belt 20 to oppose the rotation direction of transfer belt 20.

In addition, cleaning blade 270 is coupled to a driving section (not illustrated) such as a solenoid. The driving section is driven under the control of controller 40 to adjust or change the abutting pressure applied to transfer belt 20.

As illustrated in FIG. 1, cleaning liquid supply section 271 is disposed on the upstream side of cleaning blade 270. Cleaning liquid supply section 271 includes a tank (not illustrated) that stores a cleaning liquid, and a pipe, a pump, a nozzle, and so on that are coupled to the tank.

The pump operates under the control of controller 40, and cleaning liquid supply section 271 supplies the cleaning liquid stored in the tank to the surface of transfer belt 20 located on the upstream side of cleaning blade 270 through the pipe and the nozzle to make transfer belt 20 wet and to cause the remaining ink or the like to resolve.

As transfer belt 20 rotates clockwise, the cleaning liquid supplied onto the surface of transfer belt 20 is scraped by cleaning blade 270 along with the resolved remaining ink or the like and is removed from transfer belt 20.

Image reading section 30 includes, for example, charge coupled device (CCD) sensors or the like arranged in an array. An image of light reflected by the surface of transfer belt 20 is formed on a light-receiving surface of the CCD sensors. In this manner, image reading section 30 reads the image of ejected ink borne on transfer belt 20.

In the present embodiment, image reading section 30 is disposed on the downstream side of each head unit 10 and on the upstream side of first UV irradiation section 25 in the conveying direction.

Note that in another configuration example, image reading section 30 may be disposed on the downstream side of first UV irradiation section 25. In the present embodiment, on the other hand, the UV irradiation output of first UV irradiation section 25 may be set higher than the usual level under the control of controller 40 as described below. In such a case, the state of an ink dot is highly likely to be different greatly from the usual state (semi-cured state).

Therefore, in the present embodiment, image reading section 30 is desirably disposed at a position preceding a UV irradiated region of first UV irradiation section 25. With such an arrangement, image reading section 30 reads the state of the yet-to-be-cured ink or image, and controller 40 detects a defect or the like of the read image. Thus, errors in such detection can be suppressed.

The other major functional configuration of inkjet image forming apparatus 1 will be described next with reference mainly to FIG. 2. Inkjet image forming apparatus 1 includes head driving section 101 and inkjet head 102 that are included in each head unit 10, controller 40, conveying driving section 51, and input/output interface 52.

Head driving section 101 outputs individual driving signals that cause respective piezoelectric elements to deform and operate in accordance with image data at appropriate timings, to the respective recording elements of the corresponding inkjet head 102 under the control of controller 40. In this manner, head driving section 101 causes amounts of ink that correspond to respective pixel values of the image data to be ejected from the respective nozzles of inkjet head 102.

Controller 40 includes central processing unit (CPU) 41, random access memory (RAM) 42, read-only memory (ROM) 43, and storage section 44.

CPU 41 reads various control programs and setting data that are stored in ROM 43, stores the programs and the setting data in RAM 42, and executes the programs to perform various arithmetic processes. CPU 41 also centrally controls the entire operation of inkjet image forming apparatus 1.

RAM 42 provides a work memory space to CPU 41 and stores temporary data. Note that RAM 42 may include a nonvolatile memory.

ROM 43 stores various control programs to be executed by CPU 41, setting data, and so on. Note that a rewritable nonvolatile memory such as an electrically erasable programmable read-only memory (EEPROM) or a flash memory may be used in place of ROM 43.

In the present embodiment, controller 40 has a role of controlling the entire apparatus and has a role of a defect detector that detects a defect in an image read by image reading section 30.

Storage section 44 stores a print job (image formation instruction including various kinds of user setting information such as the number of pages to be printed) input from external apparatus 2 via input/output interface 52 and stores image data relating to the print job. For example, a hard disk drive (HDD) is used as storage section 44. In addition, a dynamic random access memory (DRAM) may be used in conjunction with the HDD.

Conveying driving section 51 supplies a driving signal to a conveying-drum motor of conveying drum 24 on the basis of a control signal supplied from controller 40, to cause conveying drum 24 to rotate at a predetermined speed at a predetermined timing. In addition, conveying driving section 51 supplies a driving signal to a motor of transfer roller 23 on the basis of a control signal supplied from controller 40, to cause transfer belt 20 to rotate at a predetermined speed at a predetermined timing.

Input/output interface 52 mediates transmission and reception of data performed between external apparatus 2 and controller 40. Input/output interface 52 may be, for example, any of various serial interfaces, any of various parallel interfaces, or any combination of these.

External apparatus 2 may be, for example, a personal computer, and supplies a print job, image data, and the like to controller 40 via input/output interface 52.

Figure 3:
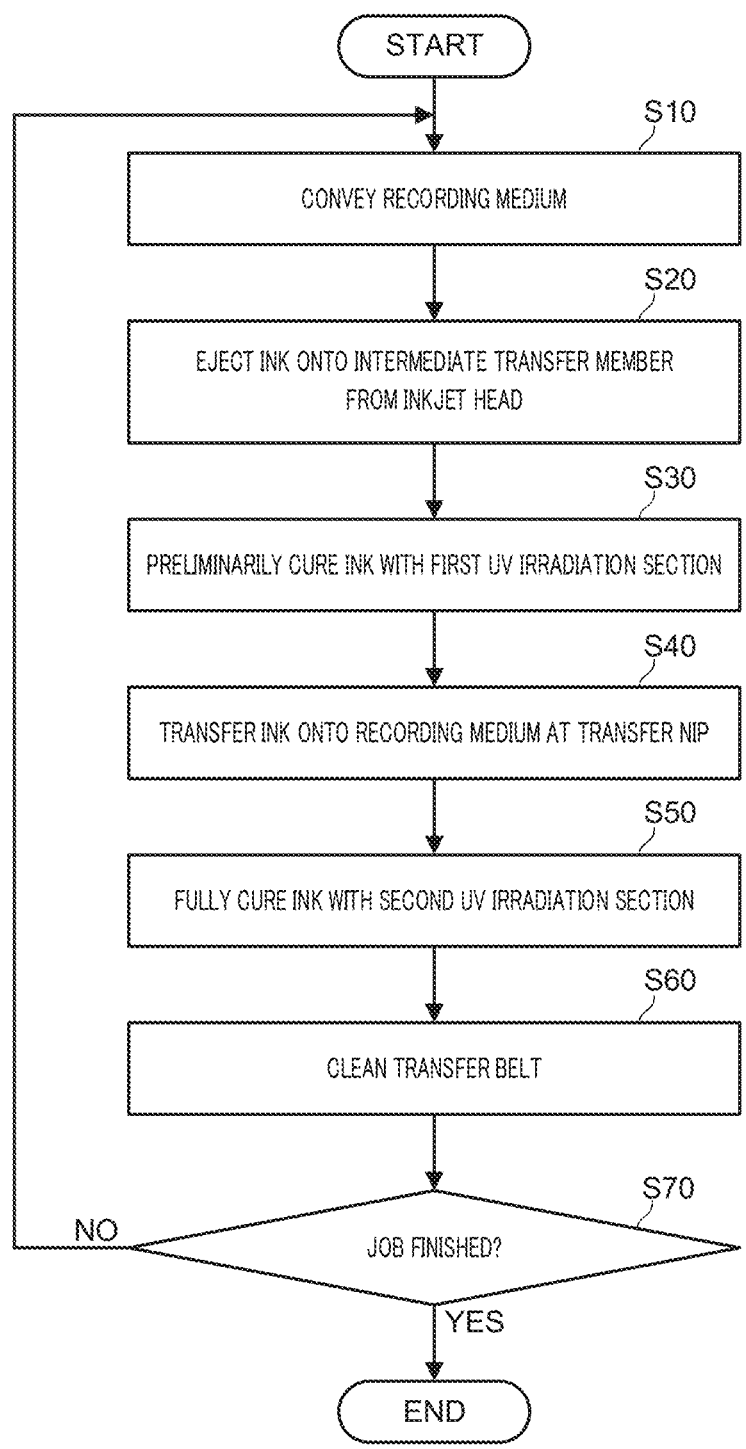
FIG. 3 is a flowchart describing a process performed when a normal print job is executed.

A process performed by controller 40 when a normal print job is executed will be described next with reference to a flowchart of FIG. 3.

In step S10, which is after receipt of a print job, image data, and the like, controller 40 controls conveying driving section 51 so that conveying driving section 51 drives conveying drum 24 and transfer roller 23 to start conveying recording medium P.

In step S20, controller 40 controls head driving sections 101 on the basis of the received image data and user setting data, so that inks are ejected onto transfer belt 20 (transfer member) from respective inkjet heads 102 of corresponding head units 10 of the colors used in printing (image formation). As a result of such an operation, an image (ink image) based on the input image data is attached to or formed (borne) on transfer belt 20.

In step S30, controller 40 controls the output (amount of UV light) of first UV irradiation section 25 to be the above-described intensity at a timing at which the ink image on transfer belt 20 reaches the position of first UV irradiation section 25. In this manner, controller 40 performs an ink image preliminary curing step.

In step S40, controller 40 controls conveying driving section 51 so that recording medium P is conveyed to transfer nip NP at a predetermined timing, and causes the ink image preliminary cured on transfer belt 20 to be transferred onto recording medium P. At this time, the ink image is pressed (nipped at transfer nip NP) by a transfer pressure set in advance. Consequently, the ink image preliminary cured on transfer belt 20 is transferred onto recording medium P such that the ink image is expanded as a whole in accordance with the density of preliminary cured ink, the transfer pressure, and the like.

In step S50, controller 40 controls the output of second UV irradiation section 26 at a timing at which recording medium P having the transferred ink image thereon reaches the position of second UV irradiation section 26. In this manner, controller 40 performs an ink image fully curing step. Thereafter, recording medium P is discharged by the discharge section (not illustrated).

In addition, in step S60, controller 40 drives the pump of cleaning section 27 at an appropriate timing to perform a process of cleaning the remaining ink or the like on transfer belt 20.

In step S70, controller 40 determines whether the print job is finished. Here, if controller 40 determines that the print job is not finished yet (NO in step S70), the process returns to step S10. Controller 40 then repeatedly performs the processing of steps S10 to S70 described above. On the other hand, if controller 40 determines that the print job is finished (YES in step S70), the series of processing steps ends.

In this manner, the transfer-type inkjet image forming apparatus can evenly expand ink on recording medium P without causing bleeding of the ink while suppressing the amount of ink ejected from each inkjet head 102. Thus, the transfer-type inkjet image forming apparatus can advantageously save ink.

Meanwhile, it is important for inkjet image forming apparatuses to detect and address an image defect such as a lack or distortion of ejected ink from the viewpoint of reducing waste paper and waste ink. Accordingly, many inkjet image forming apparatuses have a function of regularly printing a test pattern for image adjustment to monitor whether there is an image defect while the apparatuses are in operation.

In addition, in inkjet image forming apparatuses, a situation may occur where unintended ink is attached to a transfer member (transfer belt 20 in this example), when the apparatuses stop in response to the occurrence of an abnormal event such as jamming, because of dripping of ink that has been attached to a portion around nozzles of an inkjet head, or the like. The ink attached to the transfer member need not be transferred onto recording medium P.

Image forming apparatuses of the related art, however, process this useless ink attached to the transfer member by transferring the ink onto recording media P to remove the ink. The resulting waste paper problematically increases the cost. In addition, when a high-quality sheet, a special sheet, or the like is used as recording medium P, such a problem of the increased cost becomes more serious.

As described above, performing control for separating the transfer nip is the simplest measure as a solution to this problem. However, if recent inkjet image forming apparatuses having increased printing speed and increased size attempt to perform an operation for separating the transfer nip in a short time, a large-scale mechanism is required and an image defect such as shock noise may occur.

In addition, as another solution, PTL 2 mentioned above has proposed a configuration in which an ink removing member abuts against a portion on the upstream side of a transfer nip. In this case, however, an operation for pressing and separating the ink removing member is needed as in the case of moving the transfer member.

In addition, since pressure unevenness is more likely to occur between the transfer member and the ink removing member in the configuration proposed in PTL 2, an insufficiently cleaned portion may occur locally. Therefore, the ink that is attached to the transfer member and that is not to be transferred onto recording medium P also needs to be removed by transferring the ink onto recording medium P. This may cause waste paper.

Among the foregoing, particularly ink such as a test pattern or purged ink that is regularly ejected independently of an output product of a print job need not be printed when recording medium P is conveyed. It is considered that the printing is to be performed using an interval or the like between recording media P that are consecutively conveyed, for example. However, transfer-type inkjet image forming apparatuses of the related art have problems that transfer of the ink onto a conveying member is inevitable and a dedicated cleaning mechanism or the like needs to be additionally installed.

As for electrophotographic image forming apparatuses such as so-called laser printers, a technique of suppressing transfer by applying reverse-bias to a sheet when toner not to be transferred comes into contact with the sheet is known. That is, in electrophotographic image forming apparatuses, the transferability of an image onto a sheet (recording medium) mainly depends on a difference between an amount of charge of toner and an amount of charge of the sheet as a rule. Accordingly, the electrophotographic image forming apparatuses perform control for reducing the transferability by changing the amount of charge (polarity) of the sheet at a transfer nip portion without changing the adhesive strength (amount of charge) of the toner.

In contrast, in inkjet image forming apparatuses, an operation for reducing the transferability needs to be performed before recording medium P enters transfer nip NP, and a section that reduces the transferability needs to be provided on the upstream side of transfer nip NP. That is, in inkjet image forming apparatuses, the transferability of an image onto a sheet (recording medium P) mainly depends on the wettability of ink (the adhesive property or the permeability) as a rule, and the ink itself servers as a factor that determines the transferability. Therefore, in inkjet image forming apparatuses, the state of ink needs to be changed before recording medium P enters transfer nip NP.

To solve the problem described above, it is also conceivable that inkjet image forming apparatuses perform super-liquid-repellency applying processing on a member (conveying drum 24 or recording medium P in this example) opposing transfer belt 20 that bears ink. However, this case involves problems that it is difficult to select a material that sufficiently satisfies the functionality and the texture of sheet is spoiled.

In view of the foregoing situation, the present embodiment adopts a configuration in which control for reducing the transferability is performed on not-to-be-transferred ink among ink ejected from inkjet heads 102 onto transfer belt 20. That is, when ink borne on transfer belt 20 is not-to-be-transferred ink, controller 40 performs control for reducing the transferability of the ink, compared with the case where the ink is to-be-transferred ink.

Typical examples of "not-to-be-transferred ink" include ink forming the aforementioned test pattern for adjusting the state of ink ejected from inkjet heads 102. There are advantages that the control is easily performed for such ink and the resulting effect is large. In this case, when a test pattern is formed on transfer belt 20, controller 40 identifies that ink forming the test pattern is not-to-be-transferred ink and performs control for reducing the transferability of such ink.

In addition, examples of "not-to-be-transferred ink" may include ink such as purged ink that is regularly ejected independently of an output product of a print job.

Further, examples of "not-to-be-transferred ink" may include ink ejected from inkjet heads 102 at a timing at which an image is not transferred onto recording medium P. Examples of such ink include ink that is ejected toward an interval between recording media P (so-called between sheets) consecutively conveyed during execution of a print job and ink that is ejected to a region (region different from a region of to-be-transferred ink) such as an end portion of recording medium P.

In addition, other examples of "not-to-be-transferred ink" may include ink in the case where an unexpected image defect such as dripping, a satellite, or an ejection fault occurs during execution of a print job, ink (satellite ink or ink mist) attached to transfer belt 20 (transfer member) when purged ink is ejected, and the like.

Specifically, when controller 40 detects an image defect from the state of ink (such as a printed image or a test pattern) read by image reading section 30, controller 40 determines that ink of the defective portion is not-to-be-transferred ink. Making such a determination enables unexpected ink to be removed without being transferred onto an opposing member even when the unexpected ink attaches to transfer belt 20 during execution of a print job.

Further, other examples of "not-to-be-transferred ink" may include ink that forms an image set as a printing target in a print job when inkjet image forming apparatus 1 stops abnormally (for example, in response to the occurrence of jamming) during execution of the print job.

More specifically, when inkjet image forming apparatus 1 stops abnormally in response to the occurrence of jamming, pressing of an emergency stop button, or the like during execution of a print job, controller 40 determines that ink borne (that is, remaining) on transfer belt 20 is not-to-be-transferred ink. Making such a determination enables not-to-be-transferred ink to be removed without being transferred onto an opposing member even when a print job is suspended and waste paper or an image defect inevitably occurs.

Figure 4:
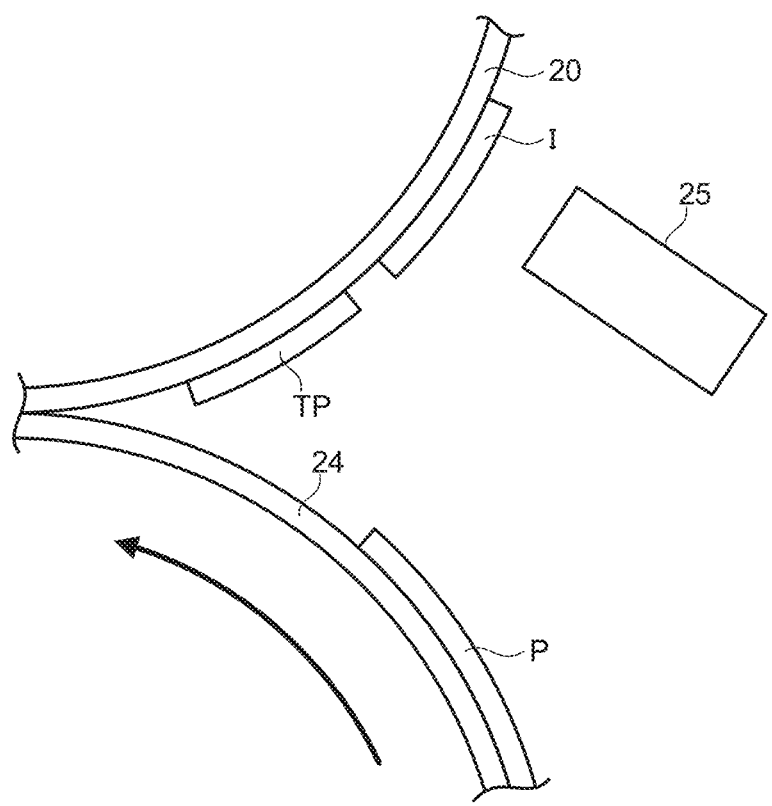
FIG. 4 is a diagram describing an overview of a process performed when the inkjet image forming apparatus according to the present embodiment outputs a test pattern.

In a specific example in the present embodiment, FIG. 4 illustrates a state in which an image of test pattern TP and an ink image I based on input image data of a normal print job are consecutively formed on transfer belt 20 and are conveyed toward transfer nip NP.

At this time, controller 40 controls first UV irradiation section 25 (viscosity adjuster) so that ink of test pattern TP, which is not-to-be-transferred ink, has a higher viscosity than the viscosity-increased (preliminary cured) state of the ink image I of the print job, which is to be transferred. More specifically, controller 40 controls the UV irradiation output of first UV irradiation section 25 so that the ink of test pattern TP loses the adhesive property and controls first UV irradiation section 25 to perform UV irradiation with an output of the aforementioned default value for the following ink image I of the print job.

As a result of performing control for increasing the viscosity of the not-to-be-transferred ink to lose the adhesive property, the not-to-be-transferred ink on transfer belt 20 loses the adhesion to an opposing member (recording medium P or conveying drum 24). Thus, transfer of the ink can be suppressed from occurring more reliably.

Here, the "state in which the adhesive property of ink is lost" in test pattern TP indicates a state in which the adhesive property of the surface layer (the front-surface side, that is, a portion opposing conveying drum 24 or recording medium P) of the ink that is ejected from inkjet head 102 and is on transfer belt 20 is lost.

That is, the "state in which the adhesive property of ink is lost" indicates that the adhesive property of ink on the back-surface side, that is, a portion attached to transfer belt 20 or of the entire ink (entire portion of the ink) need not be lost. In general, the "state in which the adhesive property of ink is lost" may be a state in which the viscosity of a surface of the ink that is to be brought into contact with an opposing member (conveying drum 24 or recording medium P, hereinafter, simply referred to as an opposing member) is locally increased.

As a rule, controller 40 controls first UV irradiation section 25 to increase the viscosity of ink so that the viscosity of the front-surface side of the ink becomes greater than the viscosity of the back-surface side of the ink.

By creating the above-described state, the adhesion (adhesive strength) of the front side of not-to-be-transferred ink can be greatly reduced, and the ink can be effectively prevented or suppressed from attaching to or being transferred (hereinafter, referred to as "being moved") onto the opposing member. In addition, if the adhesive property remains at a portion other than the surface layer of not-to-be-transferred ink, it becomes easier to clean transfer belt 20 with cleaning section 270 than in the case where the entire ink is fully cured while an increase in the adhesion of the back-surface side of the ink to transfer belt 20 being suppressed.

In general, since ink of the ink image I has the permeability and the adhesive property, the ink of the ink image I is adsorbed by and moved onto an opposing member at transfer nip NP. More specifically, the ink of the ink image I that is to be transferred is not cured after passing through the UV irradiated region of first UV irradiation section 25 and enters transfer nip NP while maintaining the adhesive strength. Thus, the ink of the ink image I is transferred onto recording medium P upon contact with recording medium P.

In contrast, in the case of not-to-be-transferred ink, the state of the ink is changed before the transfer and the adhesive strength to the opposing member is lost. In such a case, even if the ink enters transfer nip NP, the ink is not transferred onto the opposing member and passes through transfer nip NP with being held on transfer belt 20. The ink remaining on transfer belt 20 can be removed from transfer belt 20 by cleaning section 270 located downstream of transfer nip NP.

In the present embodiment, controller 40 controls the output of first UV irradiation section 25 (viscosity adjuster) to make the output UV light which not-to-be-transferred ink is irradiated with by first UV irradiation section 25 to a value higher than the aforementioned default value (5 mW/cm$^2$).

In a specific example of ink that is in a gel state at an ordinary temperature and becomes a sol state when being heated by UV irradiation, the viscosity of such ink is about 10 cp when the ink is ejected onto transfer belt 20 from inkjet head 102 and is increased to about 10^5 cp immediately before the ink enters the UV irradiated region of first UV irradiation section 25.

Thereafter, this ink is irradiated with the VU light having the aforementioned default value (5 mW/cm$^2$) by first UV irradiation section 25. Consequently, the viscosity of the ink increases to about 10^7 cp. In this state, the front-surface side of the ink is not cured, and the permeability and the adhesive property (adhesive strength) remains. Thus, the ink enters transfer nip NP with the adhesive strength being maintained, and is transferred onto recording medium P upon contact with recording medium P. Further, the ink passes through a region where the ink is irradiated with the UV light output of 10 W/cm$^2$ by second UV irradiation section 26 so as to have a viscosity of about 10^9 cp. Consequently, the ink is fully cured on recording medium P and is fixed on recording medium P.

On the other hand, this ink is irradiated with UV light of 5 W/cm$^2$, which is 1000 times as high as the default value, by first UV irradiation section 25. Consequently, the viscosity of the front-surface side of the ink increases to about 10^9 cp and the front-surface side is fully cured. The ink whose front-surface side is fully cured in this manner no longer have the permeability and the adhesive property (adhesive strength). Accordingly, since the ink enters transfer nip NP with the adhesive strength being lost, the ink is not transferred onto the opposing member upon contact with conveying drum 24 or recording medium P and passes through transfer nip NP with being held on transfer belt 20.

Note that excessively high irradiation output of the UV light of first UV irradiation section 25 can be a factor that decreases the ease-of-cleaning when transfer belt 20 is cleaned by cleaning section 27 and may be a factor that decreases the durability of transfer belt 20, cleaning blade 270, and so on. Accordingly, controller 40 sets the output multiplication value that is set to increase the irradiation output of first UV irradiation section 25, to a necessary and sufficient value, that is, a value at which the surface layer of the ink is sufficiently cured to lose the adhesive property.

In this manner, controller 40 performs the transfer control described above in the present embodiment. Thus, the ink that has lost the adhesive property is no longer moved from transfer belt 20 onto the opposing member even if an operation for separating (and pressing) transfer nip NP is not performed. As a result, both the occurrence of waste recording media P and a reduction in productivity of the apparatus can be suppressed.

Further, according to the present embodiment, the kinds of images of test pattern TP to be formed on transfer belt 20 can be diversified and an area of the image can be increased, compared with the related art. As a result, according to the present embodiment, various kinds of adjustment processing such as correction of a lack or distortion of ink, which are performed off line in the related art, can be performed in line.

The kinds of images of test pattern TP that can be formed on transfer belt 20 in the present embodiment include various images such as an image for adjusting an amount of ink, an image for correcting an ink ejection timing, an image for detecting a failing nozzle or an image distortion, and an image for adjusting a density (gradation).

Thus, according to the present embodiment, a region of transfer belt 20 bearing not-to-be-transferred ink (ink that has lost the adhesive property) can be supplied to transfer nip NP at a timing at which recording medium P is not located in transfer nip NP without separating transfer nip NP In other words, in the present embodiment, examples of "not-to-be-transferred ink" may include ink ejected from inkjet head 102 at a timing at which an image is not transferred onto recording medium P. As a result, printing productivity can be increased to a maximum.

In addition, in the present embodiment, controller 40 performs control described below in a process of cleaning ink or the like remaining on transfer belt 20 (see step S60 of FIG. 3) when test pattern TP or not-to-be-transferred ink of another kind is formed on transfer belt 20.

That is, controller 40 controls driving of the pump of cleaning liquid supply section 271 to increase an amount of supplied cleaning liquid compared with the normal state at a timing at which the not-to-be-transferred ink reaches cleaning blade 270. In addition, controller 40 controls the above-described driving section coupled to cleaning blade 270 to increase the abutting pressure of cleaning blade 270 against transfer belt 20 compared with the normal state at a timing at which the leading end of the not-to-be-transferred ink reaches cleaning blade 270. Then, controller 40 performs control to return the amount of supplied cleaning liquid and the abutting pressure of cleaning blade 270 against transfer belt 20 to the normal values (default values) at a timing at which the trailing end of the not-to-be-transferred ink exits from cleaning blade 270.

In general, when performing control for reducing the transferability of ink, controller 40 performs control for increasing the cleaning performance of cleaning section 27 compared with the case where controller 40 does not perform the control for reducing the transferability of ink.

By performing such control, ink whose surface is fully cured on transfer belt 20 can be smoothly removed at the time of formation of an image such as test pattern TP for which an amount of ink to be cleaned increases compared with the normal state (that is, when not-to-be-transferred ink is ejected onto transfer belt 20).

An example of a process performed by controller 40 when controller 40 diagnoses whether there is an image defect by forming the aforementioned test pattern TP on transfer belt 20 will be described next with reference to a flowchart illustrated in FIG. 5. Note that the illustrated flowchart assumes the case where a predetermined timing for image diagnosis (a threshold of the number of printed sheets in this example) comes during execution of a print job.

In step S110, which is after execution of a print job is started, controller 40 sets the UV irradiation condition (output) of first UV irradiation section 25 to the aforementioned default value (5 mW/cm$^2$). Then, controller 40 performs the normal printing process (steps S10 to S70) described above with reference to FIG. 3.

In step S120, controller 40 determines whether the number of printed recording media P on which images (ink images based on respective pieces of input image data) have been transferred has reached a predetermined number of sheets set in advance. Here, if controller 40 determines that the number of printed recording media P has not reached the predetermined number of sheets yet (NO in step S120), controller 40 continues the normal printing process (steps S10 to S70 illustrated in FIG. 3) and repeatedly performs the determination of step S120.

On the other hand, controller 40 determines that the number of printed recording media P has reached the predetermined number of sheets (YES in step S120), the process proceeds to step S130.

In step S130, controller 40 controls each head unit 10 to eject an ink image that forms test pattern TP to a region of transfer belt 20 where an ink image based on the input image data is not ejected.

Thereafter, the image of test pattern TP formed on transfer belt 20 is read by image reading section 30, and controller 40 determines (diagnoses) whether there is an image defect such as a failing nozzle or an image distortion. Based on such a diagnosis result, controller 40 performs processing of adjusting an amount of ink ejected from each inkjet head 102, of correcting a timing at which ink on transfer belt 20 is sent to transfer nip NP, of adjusting and correcting the density (gradation), or the like. Note that the processing of determining whether there is an image defect and the various kinds of adjustment processing are substantially the same as techniques of the related art. Thus, detailed description is omitted.

In step S140, controller 40 determines whether an image (ink image based on the input image data, hereinafter, referred to as an "immediately preceding image" for convenience) formed immediately before (located on the downstream side of) the image of test pattern TP on transfer belt 20 has completely passed through the UV irradiated region of first UV irradiation section 25.

Such a determination can be performed, for example, by controller 40 identifying the position of the formed image of test pattern TP on transfer belt 20 in the conveying direction and monitoring an angular velocity of a driving source (such as a motor) of transfer belt 20, a rotation position (phase) of transfer belt 20, and so on. Alternatively, a time period (reference time period) from a timing at which ink forming the image of test pattern TP is ejected to a timing at which the ink reaches the irradiated region of first UV irradiation section 25 may be measured in advance, and such a determination may be made on the basis of the reference time period. The determination technique described above also applies to step S160 described later, and further to steps S410 and S440 (see FIG. 9), and so on.

Here, if controller 40 determines that the immediately preceding image has not completely passed yet (NO in step S140), controller 40 repeats the determination processing of step S140 until the determination result indicates YES. On the other hand, if controller 40 determines that the immediately preceding image has completely passed through the UV irradiated region of first UV irradiation section 25 (YES in step S140), the process proceeds to step S150.

In step S150, controller 40 controls the output of first UV irradiation section 25 to set the UV irradiation condition (output) of first UV irradiation section 25 to a value (5 W/cm$^2$ in this example) that is greater than the aforementioned default value.

At this time, the ink forming test pattern TP on transfer belt 20 passes through the UV irradiated region of first UV irradiation section 25 whose output is increased. Consequently, the viscosity of the entire ink increases, the front-surface side of the ink is fully cured, and the adhesive property of the ink is lost.

In subsequent step S160, controller 40 determines whether the image of test pattern TP on transfer belt 20 has completely passed through the UV irradiated region of first UV irradiation section 25.

Here, if controller 40 determines that the image of test pattern TP has not completely passed yet (NO in step S160), controller 40 repeatedly performs the determination of step S160 until the determination result indicates YES. On the other hand, if controller 40 determines that the image of test pattern TP has completely passed through the UV irradiated region of first UV irradiation section 25 (YES in step S160), the process proceeds to step S170.

In step S170, controller 40 sets the UV irradiation condition (output) of first UV irradiation section 25 to return (decrease) to the aforementioned default value (5 mW/cm$^2$). The process then proceeds to step S180.

In step S180, controller 40 determines whether printing of the last page in the print job has completed. Here, if controller 40 determines that printing of the last page has not completed yet (NO in step S180), the process returns to step S120. Controller 40 repeatedly performs the processing of steps S120 to S180 described above.

On the other hand, if controller 40 determines that printing of the last page has completed (YES in step S180), the series of processing steps ends.

As described above, inkjet image forming apparatus 1 according to the present embodiment can omit processing of separating transfer nip NP and pressing transfer nip NP to come into contact again when the image of test pattern TP is formed. As a result, the inkjet image forming apparatus 1 can suppress both the occurrence of waste recording media P (waste paper) and a reduction in productivity of the apparatus.

Figure 5:
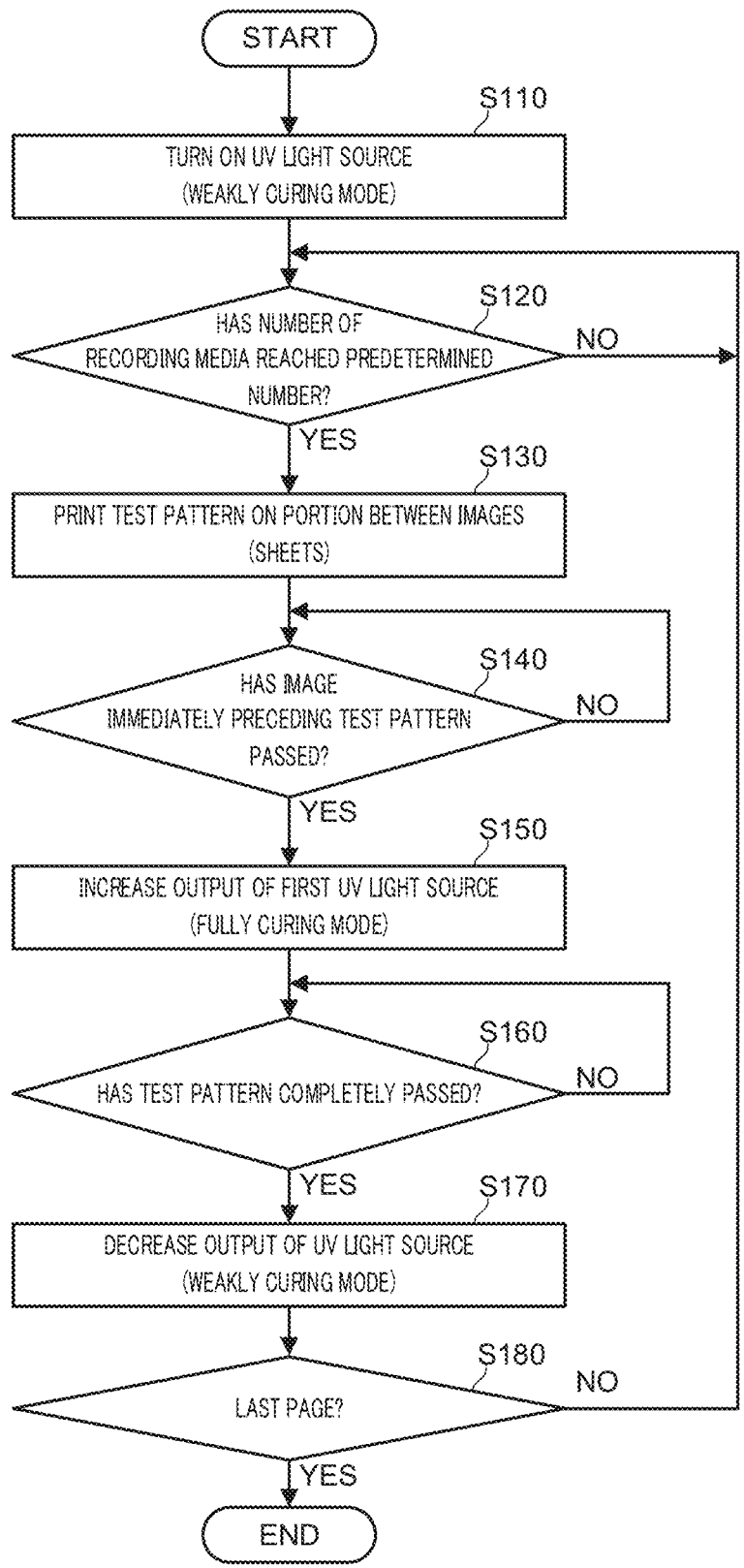
FIG. 5 is a flowchart describing an example of the process performed when the inkjet image forming apparatus according to the present embodiment outputs a test pattern.

While the case of forming the image of test pattern TP for testing and adjusting an image has been described in the flowchart of FIG. 5, processing similar to the one described above can be performed in the case where purged ink is ejected onto transfer belt 20. In this case, the term "test pattern" is replaced with "purged ink" in the corresponding steps (steps S130, S140, and S160) of FIG. 5.

Meanwhile, the cases may occur where control for separating transfer nip NP is inevitably required when processing for abnormally stopping the apparatus and processing for emergently stopping the apparatus are performed, such as when an abnormal event such as jamming occurs and when an emergency stop button (not illustrated) is turned on in an inkjet image forming apparatus. However, in the present embodiment, controller 40 performs control to suppress the number of times transfer nip NP is separated to a minimum.

Contents of control performed by controller 40 when the apparatus is temporarily stopped due to an abnormal event such as jamming will be described below with reference to a flowchart of FIG. 6.

An exemplary case where an abnormal event occurs during execution of a print job involving a plurality of recording media P, specifically, an exemplary case where when printing is performed (ink is transferred) on recording medium P at transfer nip NP, jamming of the preceding recording medium P that is conveyed (discharged) by the discharge section located on the downstream side occurs, is assumed here.

Controller 40 performs processing for temporarily stopping operations of the individual sections to be controlled, in step S210 in which jamming is detected. Thereafter, controller 40 controls the individual sections so that components other than components (such as the roller of the discharge section in this example) that cannot be driven because of jamming restart the operation.

In step S220, controller 40 controls first UV irradiation section 25 to enter a fully curing mode. Specifically, controller 40 sets the output (an amount of UV light) of first UV irradiation section 25 to a level substantially equal to the default value (10 W/cm$^2$) of the irradiation intensity of second UV irradiation section 26 described above.

Accordingly, ink forming an image on transfer belt 20 and having passed right under (that is, through the UV irradiated region of) first UV irradiation section 25 after the fully curing mode is set is fully cured on transfer belt 20.

In step S230, controller 40 determines the type of the image located right under first UV irradiation section 25 when the apparatus is abnormally or emergently stopped. In this example, controller 40 determines whether the image located right under first UV irradiation section 25 when transfer belt 20 is stopped is an image to be transferred onto recording medium P currently located at transfer nip NP.

Note that the type of such an image can be identified from a job history on the basis of the timing at which the image reaches a portion right under first UV irradiation section 25 from the printing timing (time at which the ink is ejected from inkjet head 102).

Here, if controller 40 determines that the image is an image to be transferred onto recording medium P (YES in step S230), processing of steps S240 to S260 described later is skipped and the process proceeds to step S270.

That is, in this case, since an image relating to a print job that is under transfer is located in the UV irradiated region of first UV irradiation section 25, controller 40 switches the output of the UV irradiation of first UV irradiation section 25 to the fully curing mode while keeping transfer nip NP in the contact state to fully cure the ink forming the remaining image.

Thereafter, the semi-cured ink that is located in a region from a position right under first UV irradiation section 25 to transfer nip NP when inkjet image forming apparatus 1 is emergently stopped can be removed by transferring the ink onto recording medium P (that is, waste paper inevitably caused) that is subjected to printing at the time of the occurrence of jamming. On the other hand, other ink that is determined by controller 40 to be not-to-be-transferred ink is caused to pass through transfer nip NP and is cleaned by cleaning section 27.

On the other hand, if controller 40 determines that the image is an image that is not to be transferred onto recording medium P (NO in step S230), controller 40 determines that the image contains not-to-be-transferred ink and performs processing of steps S240 to S260.

That is, this case is considered as a case where an image to be transferred onto recording medium P that follows recording medium P currently located in transfer nip NP is located in the UV irradiated region of first UV irradiation section 25. In such a case, an opposing member (conveying drum 24 or the following recording medium P) may be stained by semi-cured ink that is located in the region of transfer belt 20 from the position corresponding to first UV irradiation section 25 to transfer nip NP when the apparatus is emergently stopped.

Accordingly, in this case, processing of steps S240 to S260 below is performed so that transfer nip NP is separated, driving of transfer belt 20 is restarted, and transfer nip NP is pressed to be in contact again after at least the entire semi-cured ink passes through the portion of transfer nip NP.

In step S240, controller 40 controls transfer roller 23 to move (retract) upward. In this manner, controller 40 separates transfer nip NP. Accordingly, while transfer nip NP is separated, ink on transfer belt 20 is not moved onto an opposing member (recording medium P or conveying drum 24).

In subsequent step S250, controller 40 determines whether the entire weakly cured ink on transfer belt 20, that is, the ink irradiated with UV of the default output by first UV irradiation section 25 has passed through the region (nip portion) of transfer nip NP.

Here, if controller 40 determines that the entire weakly cured ink has not passed through the region of transfer nip NP yet (NO in step S250), controller 40 repeatedly performs this determination until the determination result indicates YES.

On the other hand, if controller 40 determines that the entire weakly cured ink has passed through the region of transfer nip NP (YES in step S250), controller 40 controls transfer roller 23 to move downward. In this manner, controller 40 performs processing for pressing transfer nip NP to be in contact in step S260. As a result of such processing, only the completely cured ink remains on transfer belt 20, and the ink is not moved onto the opposing member (recording medium P or conveying drum 24).

In subsequent step S270, controller 40 determines whether removal of the remaining ink attached to transfer belt 20 after the occurrence of jamming has completed. Here, if controller 40 determines that removal of the remaining ink has not completed yet (NO in step S270), controller 40 repeatedly performs this determination until the determination result indicates YES.

On the other hand, if controller 40 determines that removal of such remaining ink has completed (YES in step S270), the process proceeds to step S280, in which controller 40 performs processing of restarting the operation of the inkjet image forming apparatus 1.

The inkjet image forming apparatus according to the present embodiment that performs such processing is capable of suppressing the number of times transfer nip NP is separated and the occurrence of waste paper to a minimum and is capable of reducing the time to the operation restart even when the apparatus stops at an unintended timing.

A process performed by controller 40 when an ejection fault such as dripping or a satellite occurs when inkjet head 102 ejects ink during printing will be described next with reference to a flowchart of FIG. 7.

In step S310, which is after execution of a print job is started, controller 40 detects the ejection fault. Controller 40 can detect such an ejection fault by comparing an ink image on transfer belt 20 that is read by image reading section 30 with an image based on input image data.

In subsequent step S320, controller 40 determines whether a portion where the image defect has occurred (hereinafter, referred to as a "defective portion" for convenience) has reached the UV irradiated region of first UV irradiation section 25. Here, if controller 40 determines that the defective portion has not reached the UV irradiated region of first UV irradiation section 25 (NO in step S320), controller 40 repeatedly performs this determination until the determination result indicates YES.

On the other hand, if controller 40 determines that the defective portion has reached the UV irradiated region of first UV irradiation section 25 (YES in step S320), the process proceeds to step S330, in which controller 40 performs control to increase the output of first UV irradiation section 25 (to enter the fully curing mode). The degree by which the output is increased at this time is substantially equal to that of step S220 of FIG. 6 described above.

In step S340, controller 40 determines whether the defective portion has passed through (has exited from) the UV irradiated region of first UV irradiation section 25. Here, if controller 40 determines that the defective portion has not passed through (has not exited from) the UV irradiated region of first UV irradiation section 25 yet (NO in step S340), controller 40 repeatedly performs this determination until the determination result indicates YES.

On the other hand, if controller 40 determines that the defective portion has passed through (has exited from) the UV irradiated region of first UV irradiation section 25 (YES in step S340), the process proceeds to step S350, in which controller 40 performs control to decrease the output of first UV irradiation section 25 (to return the output to the default value).

As a result of performing such control, only an image of an ejection fault such as dripping is fully cured on transfer belt 20, and the image is prevented from being transferred onto an opposing member such as recording medium P. Thus, the occurrence of waste paper can be prevented.

Thereafter, controller 40 controls each section to restart the normal printing operation in step S360.

In accordance with the present embodiment in which such an operation is performed, when an ejection fault occurs in a normal printing operation, the occurrence of waste paper can be prevented and the printing operation of the apparatus can be restarted quickly.

Figure 7:
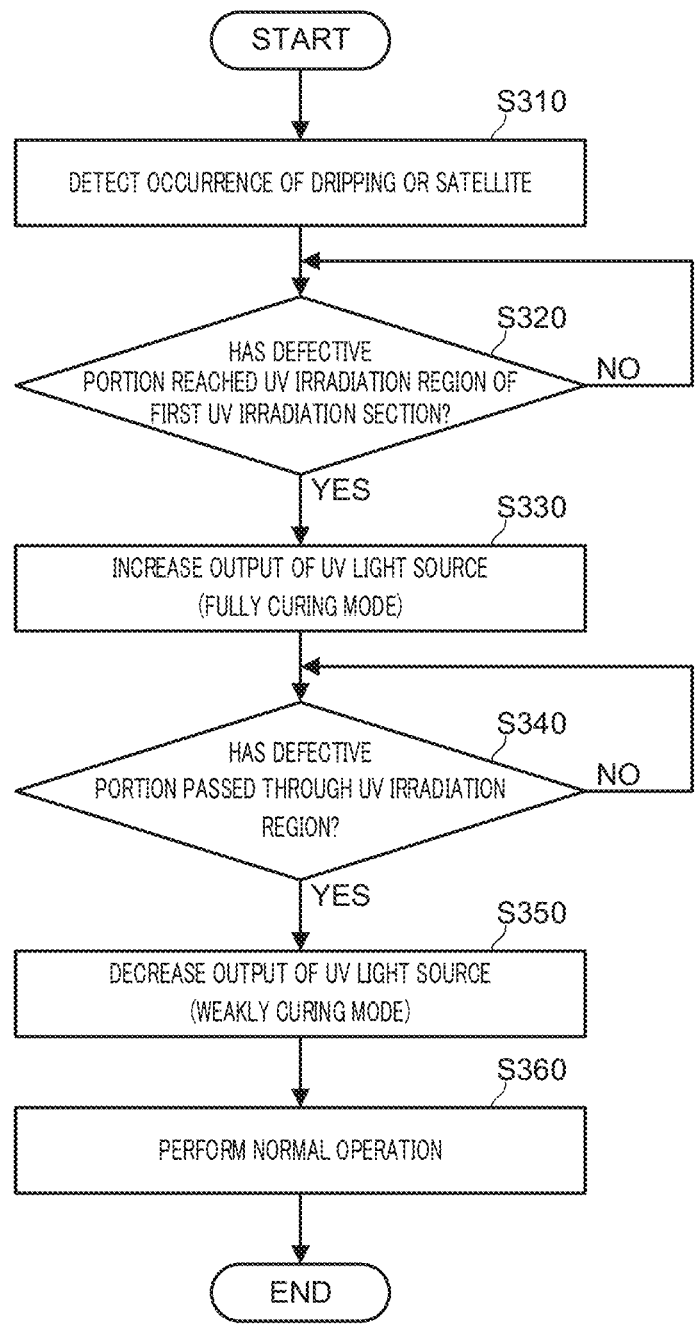
FIG. 7 is a flowchart describing an example of a process performed when the inkjet image forming apparatus according to the present embodiment detects a faulty image.

While the example of detecting an image defect of an image relating to a print job in normal printing has been described in the example of FIG. 7, processing that is similar to the above-described one is also applicable to an image defect of test pattern TP described above.

Another configuration example of an inkjet image forming apparatus will be described next with reference to FIG. 8. Note that portions that are the same or substantially the same as those described in FIG. 1 are denoted by the same reference signs, and description thereof is appropriately omitted.

Figure 8:
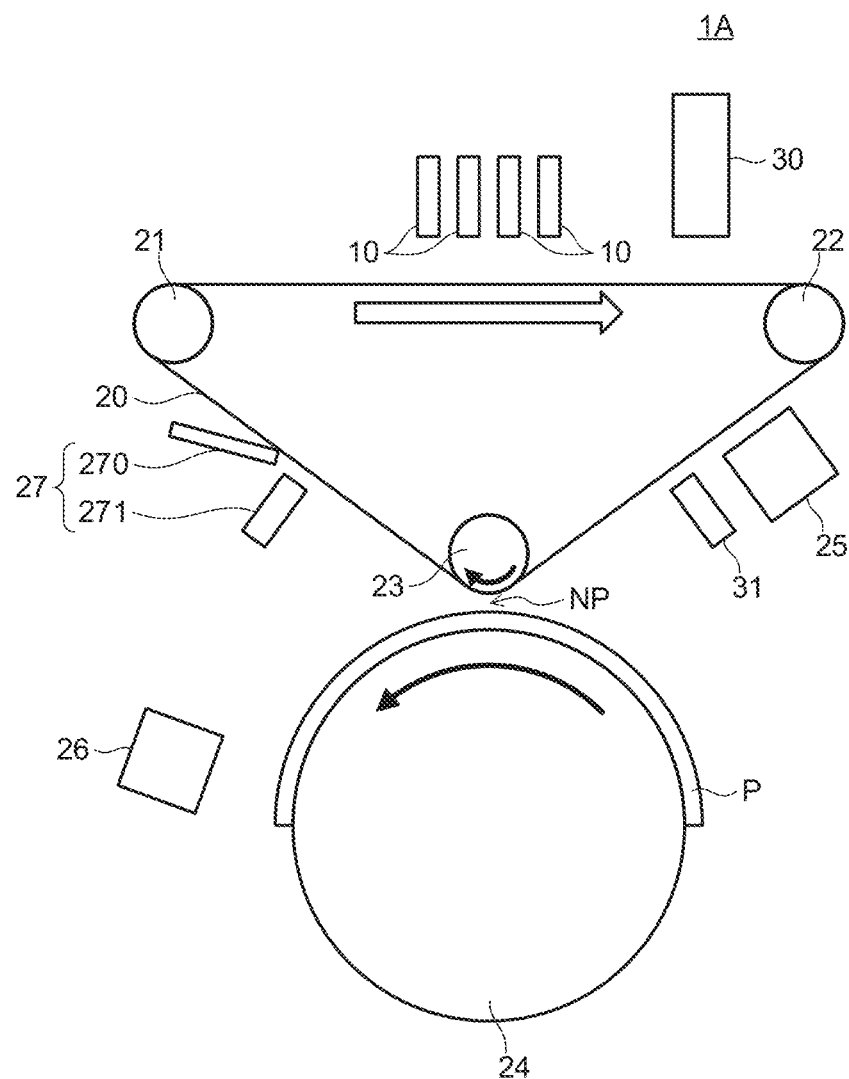
FIG. 8 is a schematic configuration diagram describing another configuration example of the inkjet image forming apparatus according to the present embodiment.

In inkjet image forming apparatus 1A illustrated in FIG. 8, image reading section 30 and first UV irradiation section 25 are disposed at more upstream positions than those in inkjet image forming apparatus 1 described in FIG. 1.

In addition, in inkjet image forming apparatus 1A, after-coating agent supply section 31 is disposed at a position that is downstream of first UV irradiation section 25 and is upstream of transfer nip NP This after-coating agent supply section 31 corresponds to "a transfer agent supplier" according to an aspect of the present invention.

After-coating agent supply section 31 has a function of supplying a transfer agent for improving the ease-of-peeling of ink on transfer belt 20 from transfer belt 20, by extension, the transferability of the ink onto recording medium P. After-coating agent supply section 31 includes a container (not illustrated) that contains a liquid transfer agent (also referred to as a transferability improving liquid), a spray portion (spray device) (not illustrated) that sprays the transferability improving liquid contained in the container onto an opposing portion of transfer belt 20, and so on. Among these, the spray portion (spray device) is capable of switching on and off spraying of the transferability improving liquid onto transfer belt 20 under the control of controller 40.

Note that the transfer agent (transferability improving liquid) is a liquid that increases the adhesive property of the ink onto recording medium P and does not contain any colorant. As ingredients thereof, various known materials other than colorants can be used. In addition, the transfer agent desirably contain a material that has a high adhesive property at transfer nip NP and loses the adhesive property through treatment (heating, for example) or naturally on the downstream side of transfer nip NP. Such a material can cause the transfer agent to function as an adhesive layer of ink and recording medium P, which is thus preferable.

As a specific example of such a material, a thermoplastic resin (styrene acrylic resin, for example) can be used.

In addition, as a specific example of after-coating agent supply section 31, a configuration that uses styrene acrylic resin as the transfer agent and that supplies the styrene acrylic resin onto transfer belt 20 by spraying is adopted. The temperature at a spray nozzle when spraying is performed is set to 200° C., and the temperature of transfer roller 23 is set to 160° C. In this manner, the spray nozzle and transfer roller 23 may be heated to have temperatures that are higher than a glass transition temperature of the transfer agent (styrene acrylic resin). Further, in this case, a configuration may be adopted which includes a heating section such as a heater that heats the transfer agent transferred on recording medium P on the downstream side of transfer nip NP. In addition, in the case where the transfer agent transferred on recording medium P is caused to dry naturally on the downstream side of transfer nip NP, a volatile material may be used as the transfer agent.

Further, in inkjet image forming apparatus 1A illustrated in FIG. 8, the default value of the UV irradiation condition (output) of first UV irradiation section 25 is set to a higher value than the aforementioned value (5 mW/cm$^2$) of inkjet image forming apparatus 1 illustrated in FIG. 1.

In a specific example, the default value of the UV irradiation condition (output) of first UV irradiation section 25 of inkjet image forming apparatus 1A is set to 5 W/cm$^2$, which is about 1000 times as large as the aforementioned value. In this case, ink on transfer belt 20 that has passed through the UV irradiated region of first UV irradiation section 25 is in a state in which at least the surface thereof is fully cured.

Note that it is not necessarily required to fully cure (or dry) the surface of the ink on transfer belt 20 that has passed through the UV irradiated region of first UV irradiation section 25 in inkjet image forming apparatus 1A. However, even if the surface of the ink is not fully cured (dried), the surface of the ink needs to have an adhesive property that is sufficiently low enough for the ink not to be transferred onto recording medium P or conveying drum 24 when the after-coating agent is not supplied.

An example of a process performed by controller 40 when inkjet image forming apparatus 1A outputs a test pattern will be described below with reference to a flowchart of FIG. 9.

In step S410, which is after a printing operation is started, controller 40 determines whether an image (that is, an ink image on transfer belt 20) has reached a region to which the after-coating agent (or the transfer agent or the transferability improving liquid, the same applies to the following) is sprayed and supplied by after-coating agent supply section 31. Here, if controller 40 determines that the image has not reached the supply region yet (NO in step S410), controller 40 repeats the determination processing of step S410 until the determination result indicates YES.

On the other hand, if controller 40 determines that the image has reached the supply region of the after-coating agent (YES in step S410), the process proceeds to step S420.

In step S420, controller 40 determines whether the image that has reached the supply region is a test pattern.

Here, if controller 40 determines that the image is not a test pattern (NO in step S420), controller 40 determines that the image that has reached the supply region of the after-coating agent is a normal image based on the input image data and performs processing of steps S430 to S450.

On the other hand, if controller 40 determines that the image that has reached the supply region is a test pattern (YES in step S420), controller 40 skips processing of steps S430 to S450 so as not to transfer the test pattern onto recording medium P. The process then proceeds to step S460.

In step S430, controller 40 controls after-coating agent supply section 31 to start an operation of supplying (applying) the after-coating agent to transfer belt 20. The process then proceeds to step S440.

In step S440, controller 40 determines whether the trailing end of the image on transfer belt 20 in the conveying direction has passed through (has exited from) the region to which the after-coating agent is supplied by after-coating agent supply section 31.

Here, if controller 40 determines that the trailing end of the image has not passed yet (NO in step S440), controller 40 repeats the determination processing of step S440 until the determination result indicates YES.

On the other hand, if controller 40 determines that the trailing end of the image has passed (has exited from) the supply region (YES in step S440), controller 40 controls after-coating agent supply section 31 to stop the operation of applying the after-coating agent onto transfer belt 20 in step S450. Then, controller 40 causes the process to proceed to step S460.

In step S460, controller 40 determines whether printing of the last page of the print job has completed. Here, if controller 40 determines that printing of the last page has not completed yet (NO in step S460), the process returns to step S410. Controller 40 repeatedly performs the processing of steps S410 to S460 described above.

On the other hand, if controller 40 determines that printing of the last page has completed (YES in step S460), the series of processing steps ends.

As described above, inkjet image forming apparatus 1A does not supply the transferability improving liquid from after-coating agent supply section 31 to an image of a test pattern. Consequently, inkjet image forming apparatus 1A can prevent the image from being transferred onto recording medium P without separating transfer nip NP. As a result, both the occurrence of waste recording media P (waste paper) and a reduction in productivity of the apparatus can be suppressed.

Figure 9:
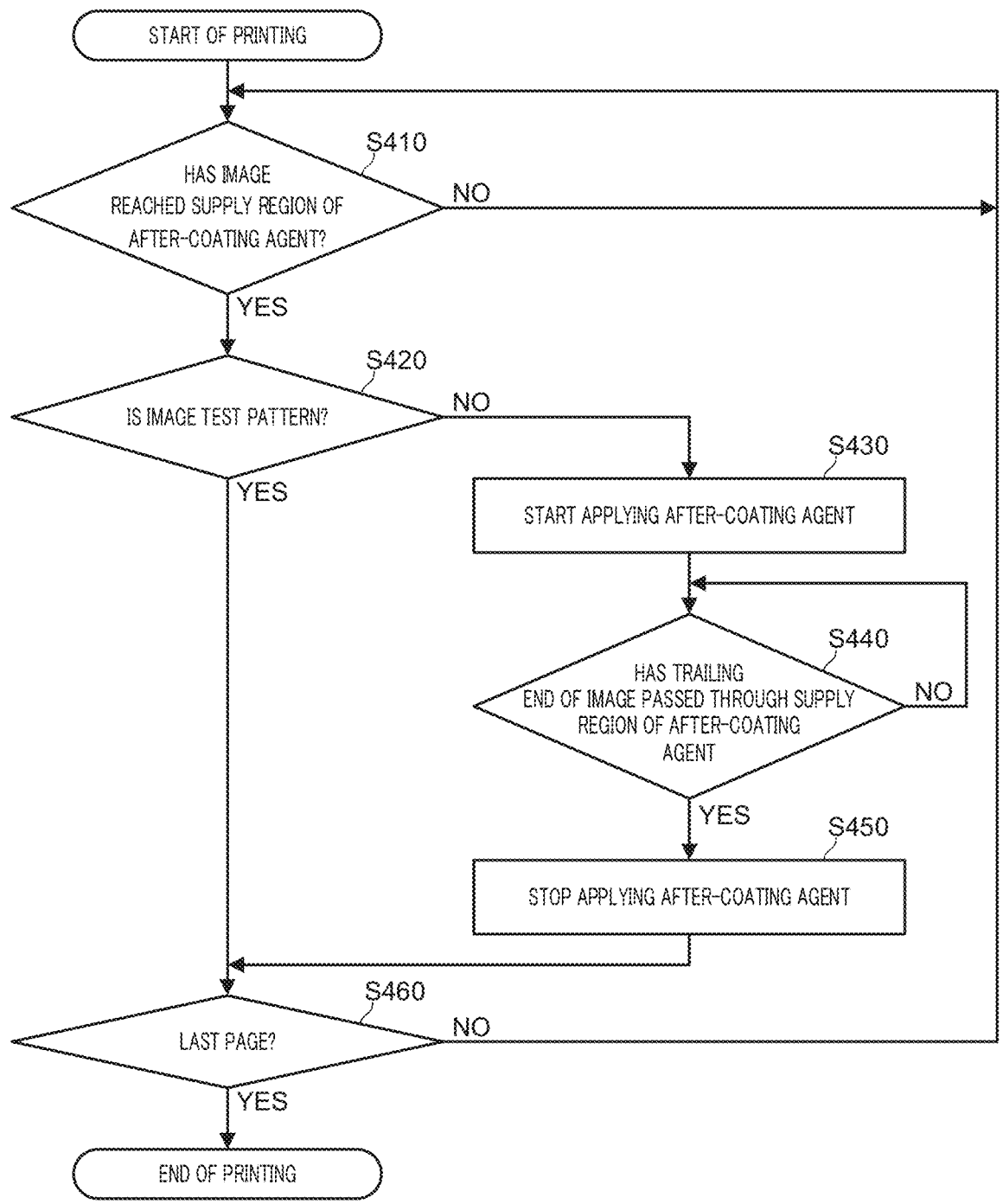
FIG. 9 is a flowchart describing an example of a process performed when the inkjet image forming apparatus having the configuration illustrated in FIG. 8 outputs a test pattern.

In the flowchart of FIG. 9, the case of forming an image of test pattern TP has been described. However, processing that is similar to the above-described one is applicable to the case where purged ink is ejected onto transfer belt 20. In this case, the term "test pattern" or "image" in the corresponding steps (steps S410, S420, and S440) of FIG. 9 is replaced with "purged ink".

In addition, the process performed when the image forming apparatus 1 emergently stops due to the occurrence of jamming or the like, which is described above in the flowchart of FIG. 6, and the process performed when an ejection fault such as dripping occurs, which is described above in the flowchart of FIG. 7, can be performed similarly in inkjet image forming apparatus 1A.

Figure 6:
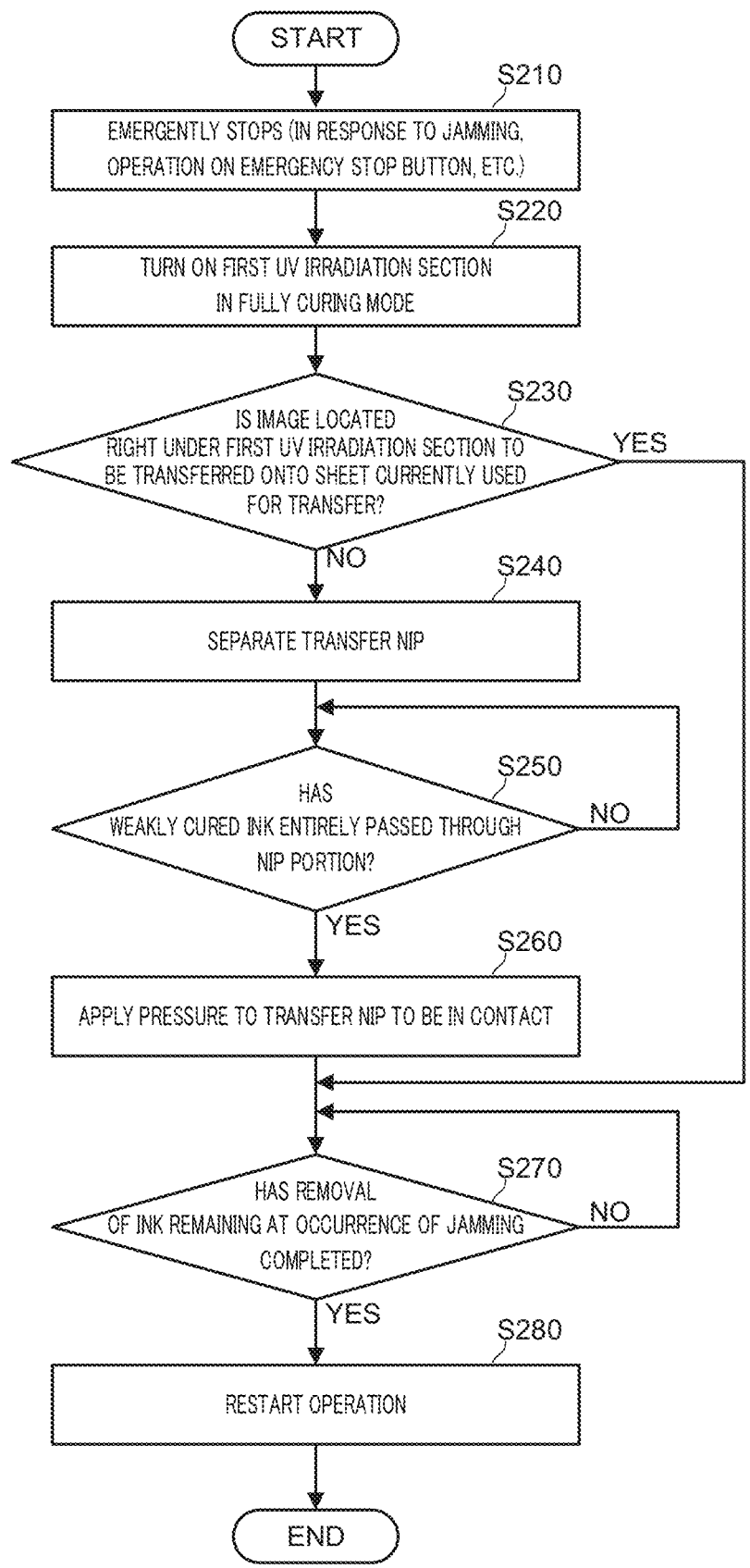
FIG. 6 is a flowchart describing an example of a process performed when the inkjet image forming apparatus according to the present embodiment stops abnormally.

That is, controller 40 may perform processing of stopping supplying (applying) the after-coating agent in step S220 of the flowchart of FIG. 6 and may determine whether the entire ink to which the after-coating agent is applied has passed through transfer nip NP in the determination of step S250 in the flowchart of FIG. 6.

In addition, controller 40 may determine whether the defective portion has reached the region to which the after-coating agent is supplied by after-coating agent supply section 31 in step S320 of the flowchart of FIG. 7 and may determine whether the defective portion has passed through (has exited from) the supply region in step S340 of the flowchart of FIG. 7.

In the embodiment described above, description has been given of the case where ink having a property that the viscosity changes depending on a dose of UV which the ink is irradiated with (an amount of UV light output from first UV irradiation section 25 and second UV irradiation section 26) is used as the ink ejected from each inkjet head 102.

In another example, ink having a property that the viscosity increases when the ink is irradiated with another activation energy ray (for example, an electron ray) other than UV light may be used. In this case, first UV irradiation section 25 and second UV irradiation section 26 may each include an electron ray generation source that radiates an electron ray.

In another example, ink having a property that the viscosity changes depending on a change in an amount of heat supplied to transfer belt 20. For example, in the case of ink that is in a gel state at an ordinary temperature and becomes a sol state when being heated, the viscosity decreases as the ink is heated more. In this case, first UV irradiation section 25 and second UV irradiation section 26 may each include a heating section (heat source) such as a heater or a halogen lamp, a reflector plate that reflects the heat so that transfer belt 20 is irradiated with the heat, and so on. Controller 40 may perform control to make the output of the heat source lower for not-to-be-transferred ink such as a test pattern than the usual level (for to-be-transferred ink).

In still another example, water-based ink including water as a solvent may be used. In the case of water-based ink, water evaporates as the ink is heated. Consequently, the viscosity increases. In this case, first UV irradiation section 25 and second UV irradiation section 26 may adopt a configuration that adjusts the viscosity by evaporating water in the water-based ink. Specifically, a configuration capable of controlling the transfer characteristics of the ink image by adjusting a ventilation temperature such as the above-described heating section and reflector plate or an air knife that generates an air current (wind) for evaporating water in the ink may be used. In addition, a configuration is not limited to the above-described one as long as the configuration is capable of removing water in the ink. For example, a member that brings a porous body into contact with the ink image to absorb a solvent including water, a squeegee blade/roller that squeezes the solvent including water, or the like may be used as well.

In addition, a configuration may be adopted in which transfer belt 20 may be composed of a non-magnetic metal material, an induction heating (IH) coil may be disposed in place of the UV light source, and the IH coil is heated by electromagnetic induction.

In the embodiment described above, the example in which a pre-coating agent is not used has been described. In another example, the inkjet image forming apparatus may include a mechanism for supplying a pre-coating agent to a portion on the upstream side of (preceding) head units 10 in the conveying direction.

In the embodiment described above, the example of the inkjet image forming apparatus that performs processing of preliminary curing ink before the ink reaches transfer nip NP at the time of normal printing has been described. In another example, the inkjet image forming apparatus may be an inkjet image forming apparatus that does not perform the preliminary curing processing at the time of normal printing. In this case, first UV irradiation section 25 may be additionally provided, and first UV irradiation section 25 may be configured to perform UV irradiation only when not-to-be-transferred ink is ejected. In this manner, an effect that is similar to the above-described one is obtained.

The various configuration examples described above can be appropriately selected or combined together according to the purpose or the like.

As described in detail above, according to the present embodiment, an inkjet image forming apparatus and a transfer control method that are capable of suppressing both the occurrence of waste recording media caused at the time of image adjustment or caused by an image defect and a reduction in productivity of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An inkjet image forming apparatus, comprising:
   a transferer that transfers, onto a recording medium, ink that is ejected from an inkjet head and is borne on a transfer member;
   a hardware processor that performs control for reducing transferability of the ink in a case where the ink borne on the transfer member is not-to-be-transferred ink, compared with a case where the ink is to-be-transferred ink; and
   a viscosity adjuster that adjusts a viscosity of the ink borne on the transfer member, on an upstream side of the transferer in a conveying direction of the recording medium, wherein
   the hardware processor controls the viscosity adjuster to increase the viscosity of the ink in the case where the ink borne on the transfer member is not-to-be-transferred ink, compared with the case where the ink is to-be-transferred ink.

2. The inkjet image forming apparatus according to claim 1, wherein the hardware processor increases the viscosity of the ink such that an adhesive property of the ink is lost.

3. The inkjet image forming apparatus according to claim 1, wherein the viscosity adjuster adjusts the viscosity of the ink without any contact with the ink.

4. The inkjet image forming apparatus according to claim 1, wherein the hardware processor increases the viscosity of the ink such that a front-surface side of the ink has a greater viscosity than a back-surface side of the ink.

5. The inkjet image forming apparatus according to claim 1, wherein the not-to-be-transferred ink is ink that is ejected from the inkjet head at a timing at which the ink is not transferred onto the recording medium.

6. The inkjet image forming apparatus according to claim 1, further comprising
   an image reader that reads an image of the ink borne on the transfer member, on an upstream side of the viscosity adjuster in the conveying direction of the recording medium.

7. The inkjet image forming apparatus according to claim 6, further comprising
   a defect detector that detects a defect in an image read by the image reader.

8. The inkjet image forming apparatus according to claim 7, wherein in a case where the defect detector detects the defect in the image, the hardware processor determines that ink in a portion of the defect is the not-to-be-transferred ink.

9. The inkjet image forming apparatus according to claim 1, wherein in a case where the inkjet image forming apparatus stops abnormally, the hardware processor determines that ink borne on the transfer member is the not-to-be-transferred ink.

10. The inkjet image forming apparatus according to claim 1, wherein
    the ink is ink whose viscosity increases when being supplied with an activation energy ray, and
    the viscosity adjuster changes a dose of the activation energy ray supplied to the transfer member to adjust the viscosity of the ink.

11. The inkjet image forming apparatus according to claim 10, wherein
    the activation energy ray is an ultraviolet ray, and
    the viscosity adjuster changes an amount of the ultraviolet ray supplied to the ink to adjust the viscosity of the ink.

12. The inkjet image forming apparatus according to claim 1, wherein
the ink is water-based ink including water as a solvent, and
the viscosity adjuster removes the water in the ink to adjust the viscosity of the ink.

13. The inkjet image forming apparatus according to claim 1, further comprising
a transfer agent supplier that supplies a transfer agent to the ink borne on the transfer member, wherein
the hardware processor controls the transfer agent supplier to supply a less amount of the transfer agent in the case where the ink borne on the transfer member is not-to-be-transferred ink than in the case where the ink is to-be-transferred ink.

14. The inkjet image forming apparatus according to claim 1, further comprising
a cleaner that cleans the ink borne on the transfer member, on a downstream side of the transferer in a conveying direction of the recording medium.

15. The inkjet image forming apparatus according to claim 14, wherein the hardware processor performs control for improving cleaning performance of the cleaner in a case of performing the control for reducing the transferability of the ink, compared with a case where the hardware processor does not perform the control for reducing the transferability of the ink.

16. An inkjet image forming apparatus, comprising:
a transferer that transfers, onto a recording medium, ink that is ejected from an inkjet head and is borne on a transfer member; and
a hardware processor that performs control for reducing transferability of the ink in a case where the ink borne on the transfer member is not-to-be-transferred ink, compared with a case where the ink is to-be-transferred ink;
wherein the not-to-be-transferred ink is ink forming a test pattern for use in adjustment of a state of ink ejected from the inkjet head.

17. A transfer control method in an inkjet image forming apparatus that transfers, onto a recording medium, ink that is ejected from an inkjet head and is borne on a transfer member, the transfer control method comprising
performing control for reducing transferability of the ink in a case where the ink borne on the transfer member is not-to-be-transferred ink, compared with a case where the ink is to-be-transferred ink; and
adjusting a viscosity of the ink borne on the transfer member, on an upstream side of the transferer in a conveying direction of the recording medium, wherein
the hardware processor controls the viscosity adjuster to increase the viscosity of the ink in the case where the ink borne on the transfer member is not-to-be-transferred ink, compared with the case where the ink is to-be-transferred ink.

* * * * *